Patented Nov. 8, 1949

2,487,480

UNITED STATES PATENT OFFICE 2,487,480

PROCESS FOR PRODUCING AMMONIUM SULFAMATE

Charles A. Rohrmann, Manoa, Pa., assignor to E. I. du Pont de Nemours & Company, Wilmington, Del., a corporation of Delaware No Drawing. Application April 26, 1945, Serial No. 590,505

2 Claims. (Cl. 23—114)

This invention relates to processes for producing sulfamates of alkali metals and ammonium, and is more particularly directed to processes in which a sulfamate or an alkali metal or ammonium, containing a sulfate, is dissolved in substantially the minimum quantity of hot water necessary to make a solution saturated with respect to the sulfamate, whereby the sulfate remains substantially undissolved, and the sulfate is removed from the solution.

Sulfamates of alkali metals and ammonium are commonly produced by neutralizing sulfamic acid with a suitable base, such as the hydroxide or carbonate of the metal involved. Often it is found that the sulfamic acid used contains appreciable amounts of ammonium sulfate and sulfuric acid. Since the neutralization of the sulfamic acid with the base is usually carried out in aqueous solution it is customary to remove the sulfate impurity from mother liquors by precipitating it as barium sulfate. Such a procedure at best is time consuming and with highly contaminated solution requires large amounts of relatively expensive barium compounds, thereby adding substantially to the cost of the sulfamate produced.

The expense of purifying the sulfamate product as above described may, of course, be reduced by starting with a sulfamic acid which is substantially free of sulfate as an impurity. Since such a grade of sulfamic acid is ordinarily available only at increased cost, and in view of the need for eventual mother liquor treatment or discard the ultimate cost favors the processes herein disclosed which utilize low cost technical quality acid.

It is an object of this invention to provide processes for the production of sulfamates of alkali metals and ammonium which have a low sulfate content. Another object is to provide such processes in which the necessity for barium precipitation of sulfate impurities is avoided. Another object is to provide such processes which permit the use of raw materials containing appreciable amounts of sulfate in making the sulfamate. Other objects will appear hereinafter.

The foregoing and related objects of this invention are accomplished by processes comprising dissolving a sulfamate, selected from the group consisting of sulfamates of alkali metals and ammonium, containing a sulfate, in substantially the minimum quantity of water necessary to make a solution saturated with respect to the sulfamate when hot, whereby the sulfate remains substantially undissolved, and removing the undissolved sulfate from the solution.

In the operation of a process of this invention an ammonium or alkali metal sulfamate solution containing a sulfate is first made up. This may be done by dissolving in water dry crystals of sulfamate containing sulfate. On the other hand, it is preferred to use a solution prepared by neutralizing sulfamic acid with a base in aqueous solution. Thus, sulfamic acid containing ammonium sulfate as an impurity may be neutralized with ammonium hydroxide or ammonium carbonate in aqueous solution to give a sulfamate solution which may be treated to advantage according to this invention. Still other ways of obtaining a suitable solution may be used, as, for instance, by effecting between anhydrous ammonia and sulfur trioxide to form ammonium imidodisulfonate, hydrolyzing the ammonium imidodisulfonate to ammonium sulfamate and ammonium acid sulfate, and neutralizing the acid sulfate to normal ammonium sulfate with ammonia.

It will be understood that when reference to alkali metals is made it is intended to include sodium, potassium, lithium, rubidium, and caesium, although of these the first two named are by far the most important.

The sulfate impurity removed from a sulfamate solution according to a process of this invention may have originated in the solution in various ways. When obtained from the sulfamic acid used to make up the sulfamate, the sulfate will be sulfuric acid, ammonium sulfate, or ammonium acid sulfate, originating from sulfamic acid hydrolysis. When obtained from the base used to neutralize sulfamic acid the sulfate will usually have a cation other than ammonium. In the sulfamate solution, of course, there will be exchange of ions, so that irrespective of where the sulfate originated, it will be removed as the sulfate least soluble in the system.

The processes of the present invention may be employed with especial advantage as a part of the operation of making sulfamates by neutralizing technical grade sulfamic acid, containing sulfates, with alkali metal or ammonium bases in aqueous solution. In such an embodiment of the invention the proportion of water used in the neutralization is controlled at or adjusted to that proportion best suited for the subsequent sulfate-removal step as hereinafter described.

The sulfamate containing sulfate as an impurity is in a process of this invention dissolved in substantially the minimum quantity of water necessary to make a solution saturated with respect to the sulfamate. That is, the quantity of water ultimately present should be not appreciably more than that required to dissolve or hold in solution all of the sulfamate. This result may be achieved by carefully controlling the amount of water originally added, so that just enough is used to dissolve all of the sulfamate but only that amount of the sulfate required to saturate the solution with sulfate. Alternatively, a lesser amount of water may be used, so that, for a given quantity of crude sulfamate, the amount of water used dissolves only a portion of the sulfate and a larger portion, but not all, of the sulfamate. In the latter case there is a sacrifice of sulfamate yield, but by re-employing the residue in a cyclic operation the yield may be improved.

The solution used should be so concentrated with respect to the sulfamate that it is substantially saturated when hot. That is, the separation of sulfate according to a process of this invention has been found to be particularly effective at solution temperatures of about from 60° C. to the boiling point of the solution, and the solution should be substantially saturated in this temperature range. This condition will, of course, be present when the solution is brought to saturation by boiling off an excess of water until sulfamate starts to crystallize out.

Having brought the solution to the required concentration it will be found that the sulfate is present in an undissolved form. It is, of course, immaterial whether the sulfate has been dissolved in a more dilute solution and re-precipitated upon concentration or has never been in solution at all. The important fact is that the sulfate is present, under the conditions described, in an insoluble form and accordingly can be removed by physical means.

The insoluble sulfate can be removed from the solution by various methods. It can be allowed to settle out and the clear solution can be decanted off, or the mixture of solution and sulfate may be separated by centrifugal means or by filtration. It is preferred that the separation be effected while maintaining the solution at elevated temperature, that is, above about the saturation temperature, to avoid loss of sulfamate due to crystallization.

The processes of this invention may be better understood by reference to the following illustrative examples:

*Example I*

A portion of crude sulfamic acid, containing 15% by weight of sulfate calculated as $SO_3$, was dissolved in water and the solution was then saturated with ammonia gas, whereby the sulfamic acid was neutralized to ammonium sulfamate. The proportions of sulfamic acid and water were so chosen that the resulting solution was saturated with ammonium sulfamate at 65° C. At that temperature a precipitate was observed in the solution.

The solution was heated to 80° C. and filtered. The filtrate was cooled to 25° C., whereby a crop of ammonium sulfamate crystals was formed. These crystals were centrifuged to free them of excess mother liquor and then dried in air at room temperature. Analysis showed that these crystals contained 0.39% sulfate calculated as $SO_3$. Analysis of the un-washed filter-cake, after drying, showed it to consist of about 78% ammonium sulfate and 22% ammonium sulfamate.

*Example II*

A water slurry containing 70 grams of chemically pure potassium carbonate was made up and neutralized with sulfamic acid containing about 1% by weight of sulfate calculated as $SO_3$. The proportions of carbonate, sulfamic acid, and water used were such as to give a saturated potassium sulfamate solution at 65° C. In the saturated solution thus obtained there was observed a heavy, fine, white precipitate. The solution was filtered at about 70° C. By analysis the precipitate obtained as a filter cake was shown to be potassium sulfate, and the potassium sulfamate was found to have experienced a corresponding decrease in sulfate content.

While in the foregoing description of this invention there have been shown certain specific processes, it will be understood that without departing from the spirit of the invention one skilled in the art may employ various processes for producing sulfamates of low sulfate content.

I claim:

1. In a process for the production of sulfamates of low sulfate content the steps comprising substantially neutralizing sulfamic acid containing a sulfate with an ammonium base to form the corresponding sulfamate and sulfate, the neutralizaton being carried out in a quantity of water not substantially greater than that necessary to dissolve the sulfamate when hot, whereby the sulfate remains substantiallly undissolved, and removing the undissolved sulfate from the solution.

2. In a process for the production of ammonium sulfamate of low sulfate content the steps comprising dissolving ammonium sulfamate containing ammonium sulfate in a quantity of water not substantially greater than that necessary to dissolve the sulfamate at 60° C., whereby the sulfate remains substantially undissolved, and filtering off the sulfate from the solution.

CHARLES A. ROHRMANN.

REFERENCES CITED

The following references are of record in the file of this patent:

UNITED STATES PATENTS

| Number | Name | Date |
|---|---|---|
| 708,079 | Roessler | Sept. 2, 1902 |
| 1,813,575 | Janecke et al. | July 7, 1931 |
| 2,232,241 | Jones | Feb. 18, 1941 |

OTHER REFERENCES

Mellor, Inorganic and Theoretical Chemistry, Longmans, London, vol. 8, page 641 (1928).